(12) United States Patent
Brobst

(10) Patent No.: US 8,640,855 B2
(45) Date of Patent: Feb. 4, 2014

(54) APPARATUS AND METHOD FOR PASSIVE DUST CONTROL IN A TRANSFER CHUTE

(76) Inventor: Steven Hays Brobst, Lafayette, CO (US)

( * ) Notice: Subject to any disclaimer, the term of this patent is extended or adjusted under 35 U.S.C. 154(b) by 67 days.

(21) Appl. No.: 13/271,210

(22) Filed: Oct. 12, 2011

(65) Prior Publication Data

US 2012/0090956 A1   Apr. 19, 2012

Related U.S. Application Data

(60) Provisional application No. 61/392,669, filed on Oct. 13, 2010.

(51) Int. Cl.
*B65G 47/04* (2006.01)
(52) U.S. Cl.
USPC ............................. 198/530; 198/526; 193/32
(58) Field of Classification Search
USPC ............ 198/525, 526, 530, 560; 193/2 R, 20, 193/21, 4; 95/267
See application file for complete search history.

(56) References Cited

U.S. PATENT DOCUMENTS

| | | | | |
|---|---|---|---|---|
| 1,803,689 A | * | 5/1931 | Bernadt | 198/524 |
| 2,120,506 A | * | 6/1938 | O'Rourke | 193/32 |
| 2,742,185 A | * | 4/1956 | Lionel | 193/32 |
| 4,410,076 A | * | 10/1983 | West et al. | 193/32 |
| 5,664,338 A | * | 9/1997 | Thom, Jr. | 198/952 |
| 6,135,171 A | * | 10/2000 | Weakly et al. | 198/560 |
| 7,228,956 B2 | | 6/2007 | Pircon et al. | |
| 7,364,034 B1 | | 4/2008 | Clark et al. | |
| 7,438,171 B1 | | 10/2008 | Clark et al. | |
| 7,789,217 B2 | | 9/2010 | Fischer et al. | |
| 2007/0251385 A1 | * | 11/2007 | Roberts et al. | 95/267 |

OTHER PUBLICATIONS

Flexco, New Coal Handling Transfer Chute Technologies Significantly Improve the Operation by Increasing Efficiencies, Reducing Maintenance, and Increasing Operating Margins, Feb. 15, 2010; http://www.flexco.com/filebase/en/src/Product_Literature/CFMTS_White_Paper-jc.pdf.

* cited by examiner

*Primary Examiner* — James R Bidwell

(57) ABSTRACT

A dust control apparatus and method for a bulk material handling transfer system having a chute comprising a pathway there through for handling varying volumes of bulk material flowing through the chute using gravity flow. A self-adjusting air restrictor gate is mounted in the chute for engaging the upper surface of flowing bulk material through the chute for restricting the air pathway during material volume flow variations to reduce dust emissions. The gate member contacts the upper surface of flowing bulk material and moves up and down in response to the flow of bulk material through the chute to restrict the flow of air to reduce dust. A counterweight mechanism and a damper helps maintain controlled contact of the air restrictor gate with the upper surface of bulk material flowing through the chute.

10 Claims, 6 Drawing Sheets

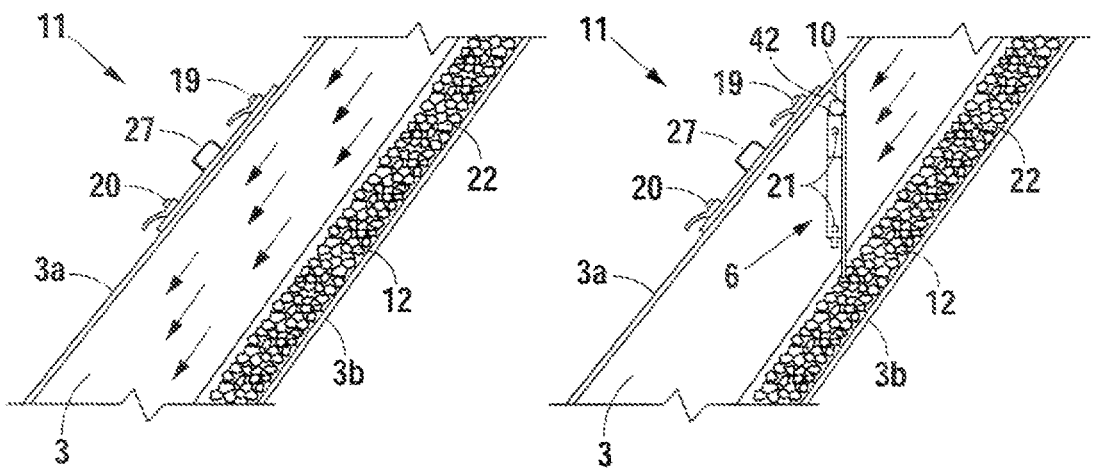
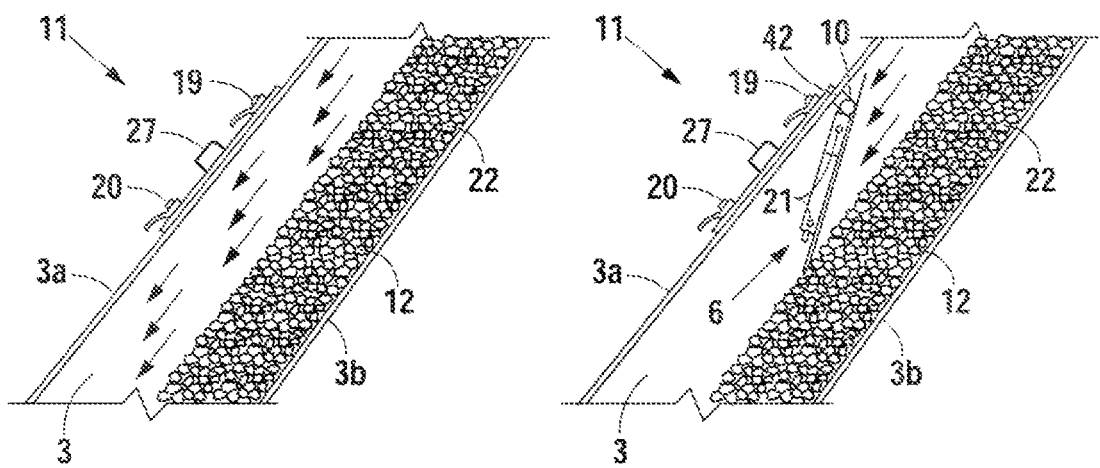

APPARATUS AND METHOD FOR PASSIVE DUST CONTROL IN A TRANSFER CHUTE

CROSS-REFERENCE TO RELATED APPLICATIONS

Applicant claims priority based on Provisional Application No. 61/392,669 entitled Air Restrictors for Bulk Material Handling Transfer Systems; Filed on Oct. 13, 2010

STATEMENTS REGARDING FEDERALLY SPONSORED RESEARCH AND DEVELOPMENT

N/A

FIELD OF THE INVENTION

The present invention relates generally to dust control systems. More specifically, the invention relations to a dust control system for transferring material from an upper conveyer to a lower conveyer by passing it through a transfer chute. During transfer of the material through the chute, the present invention minimizes induced airflow through the transfer chute and across the material. In this manner, dust emissions emanating from the material is greatly reduced and contained during transfer. Furthermore, the invention allows there to be adjustable capacity of the chute so that material flow through the chute may be increased or decreased as necessary while maintaining dust control. Finally, the chute has the flexibility to handle wet and cohesive or dry material with negligible impact to the flow of material in either condition.

BACKGROUND OF THE INVENTION

Induced airflow from the flow of material is a primary cause of airborne dust around conveyor to conveyor transfer chutes. As air follows the bulk material stream through the transfer chute, it accelerates and generates a pressure gradient in the air. The resulting airflow mixes with the material dust particles, causing dust-laden air to escape and be released to the surrounding area around the transfer point, thereby creating a dusty environment emanating at the exit of the chute.

Currently, dust-laden air is attempted to be actively captured with dust collection, suppression, fogging, or stilling/recirculation chambers. To minimize maintenance and operation costs, passive dust control technologies have been developed in recent years. New engineered controlled flow transfer chutes have been developed following the principal of condensing the flow of material and therefore minimizing the air inside the material stream. These types of controlled flow chutes have been successfully installed in industrial plants without the need for additional dust control systems.

The theory of condensing the material stream works well as long as the cross section of the material equals the cross section of the chute and minimizes or eliminates the boundary layer of induced air. If these currently used transfer chutes encounter a large variation in volume of material loading, they have difficulties maintaining a dust-free environment because the chute cannot maintain a material cross-section equal to the fixed chute cross-section. A gap may form between the material and the inner chute thereby providing a pathway for the induced air to rush through the transfer system, creating a cloud of dust emission at the exit point. Alternatively, the chute may become plugged if the material flow is greater than the chute capacity, resulting in an unscheduled shutdown of the conveyor transfer system.

Currently, there exists no other known commercially available technology that can adequately handle varying material flows while minimizing induced airflow and dust in the work area as well as minimizing the risk of plugging. Some known chutes have difficulties in passively controlling dust-laden air if there are varying material flows. If the chutes are designed for a specific load, and the plant runs at that specific load consistently, the chute typically has few problems. However, if there are varying loads, then there can be dusting issues. Basically, some known commercial prior art chutes actively manipulate the material cross sectional area as well as the material flow, which can be problematic and can result in plugging.

Another One known system has recirculation, or stilling, chambers, which has difficulty handling varying material flow and can be physically or commercially unviable due to the size of the needed chambers. A chamber is placed over and around the exit conveyor in an attempt to minimize the dust created by the induced airflow. However, this chamber is not always an effective way to minimize the dust because the air that goes into the chamber mixes with the bulk material and must exit from the chamber one way or another.

Another example of a known prior art chute involves a uniquely-shaped chute that slows the material flow down so the chute cross section is filled with material as the material travels through the chute. This chute works well with a constant flow of material, but it does not always work well if the flowing material is too sticky because sticky material causes the chute to get plugged.

Another example of prior art is flexible skirt curtains used interior to skirt enclosures located on the receiving belt after the chute discharges the material onto the receiving belt. The curtains are used to restrict flow of air though the transfer system. The rubber skirt curtains typically include slits and drilled holes to allow them to bend and distort with the varying material flow. The curtains are flexible and are un-dampered allowing them to distort and bouncing; with the result that large gaps between material, curtain, and side walls are available for dust laden air to escape the transfer system. The location of the skirt curtain is also above the receiving belt, which can also flex and sag depending on operation.

One other known prior art example has a hopper where the material flows into curved chute through a funnel. If the correct amount of material is flowing, it will be, just enough to fill the funnel and then fill the chute, and there will be no dust at the exit of the chute because there is no air that is allowed into the chute. If there is a lower material flow, then the chute can be physically adjusted up so that the material flow slows down until the chute is allowed to fill up, thereby allowing no air and ultimately no dust exiting the chute. However, it is difficult and time-consuming to move the chute, the variation of material flow is not easily handled by this system, and the chute can potentially plug if not adjusted swiftly enough.

Before the instant invention, another type of dust control material transfer system was developed and patented (U.S. Pat. No. 7,789,217). This system was designed to overcome the issue of varying material capacities by introducing an automated or manually adjustable chute wail system to automatically minimize the gap between the material and the chute wall, thereby creating a full cross-section of material inside the chute at all times. The challenge was to continually adjust the cross section and provide a full material cross-section in the chute. Typically, a chute is designed for a specific maximum capacity, i.e., 2,000 tons per hour (TPH). As long as the incoming conveyor provides 2,000 TPH of material, the chute will have a full cross-section and the induced air will be generally blocked from rushing through the transfer system. However, in a typical conveyor system, the material capacities are rarely constant. Therefore, the chute cross-section needs to be adjusted constantly or it will not always be filled, and a gap may be created to provide the induced airflow a pathway to rush through the transfer system. In addition, the system was supposed to minimize the risk of plugged chutes. In wet and cohesive conditions, the chute can be opened up to provide maximum throughput capacity for sticky materials in the wintertime or wet season. Typically, dusting is not an issue during wet seasons.

The underlying principle of the system in U.S. Pat. No. 7,789,217 is to block off the main culprit creating dust at transfer points, the induced air from material flowing through the transfer chute. This goal was achieved via a two-step approach. In step 1, the material flow is consolidated and guided through the transfer system. In step 2, the cross-section of the chute was filled with material to block off any potential pathway for the induced airflow. However, it was not an adequate solution to the problem of dust control due to automatic control challenges and economics.

There are many controlled flow chutes in today's market, but the chute design of the instant invention can automatically self-adjust to material capacity variations. The adjustable air restrictors cut off the pathway of the induced airflow by closing the gap between the material stream and the chute wall. This design minimizes the induced airflow by directly stopping the air from rushing through the transfer chute and does so without hindering the flow of material. A side effect of keeping the material stream condensed and guided through the transfer chute is a reduction of noise as observed by operation personnel.

BRIEF SUMMARY OF THE INVENTION

It is therefore an object of the invention to provide a dust control apparatus for a bulk material handling transfer system comprising a chute having a pathway there through for handling varying volumes of bulk material flowing through the chute using gravity flow, and a self-adjusting air restrictor for restricting the air pathway during material volume flow variations to minimize induced air flow. The air restrictor has a mounting system to allow the air restrictor gate to minimize any gap between the air restrictor gate and the material flow, respond to varying flows of bulk material through the chute, and restrict the flow of air through and out the chute to reduce dust emissions. The chute further comprises an entrance zone and an exit zone, wherein a flow of material is received into the chute at the entrance zone from a transfer chute that receives the material via a discharge conveyor, and the material passes through the exit zone of the chute and is expelled onto a receiving conveyor with minimal air flow and dust laden air.

It is a further object of the invention that the air restrictor comprises a gate member that is hinged off center so that it hangs from an upper wall of the chute when no bulk material is flowing through the chute. The upper wall of the chute may have an access door just below a point where an air restrictor is mounted so that the air restrictor can be easily accessed from outside the apparatus. The dust control apparatus further comprises a counterweight mechanism and a damper system to maintain controlled movement of the air restrictor so that it does not move to quickly or bang against the walls of the chute. The mounting system comprises pivot bearings on each side of the chute for rotatably mounting the support shafts on the gate member. The support shaft is connected to a counterweight mechanism and a damper system that controls the movement of the gate member as it encounters flowing bulk material through the chute.

It is another object of the invention that the dust control apparatus comprise a chute that comprises an upper wall portion and a lower wall portion and a gate member to control flow bulk material is flowing through the chute. The gate member is pivotally mounted to the upper wall portion so that it hangs in the neutral position when no bulk material is flowing through the chutes.

It is a further object of this invention to provide a method for controlling dust in a bulk material handling transfer system, comprising the steps of flowing bulk material through a transfer chute using gravity flow through the pathway there through, restricting air flow that accompanies the bulk material through the chute by using a self-adjusting air restrictor that restricts the air pathway so the air gap is minimized during material volume flow variations, and opening and closing the pathway through the chute by the varying flow of bulk material, which causes the self-adjusting air restrictor to move in response to the flow of bulk material through the chute to restrict the flow of induced air flow to reduce and control dust. The material flows into the upper end of the chute at an entrance zone from a transfer chute that receives the material from a discharge conveyor and is then expelled from the lower end of the chute a receiving conveyor at the exit zone of the transfer chute.

It is further an object of the invention to keep the bulk material stream condensed and guided through the transfer chute to reduce noise.

It is further an object of the invention to keep the bulk material stream condensed to minimize the amount of air entrained inside the stream of material.

It is a further object of the invention to damp and control the movement and oscillation of the gate member when varying amounts of bulk material are flowing through the chute or local disturbances occur in the material stream such as large chunks of material using a counterweight mechanism and a damper system in order to control the movement of the gate member and reduce the noise it makes when it swings back and forth due to varying flow.

It is a furthermore object of the invention to reduce the passage of air through the chute when varying amounts of bulk material are flowing through the chute by use of the self-adjusting air restrictor, wherein the self-adjusting air restrictor relies on gravity to maintain in contact with the flowing bulk material when varying amounts of bulk material are flowing to reduce undesired air flow through and out the chute.

BRIEF DESCRIPTION OF THE DRAWINGS

FIG. 7 shows a section of the bulk material transfer system with a low bulk material flow without an air restrictor where the airflow runs parallel with the bulk material flow in the gap between the bulk material and the chute walls, which provides the pathway for the induced airflow, creating dust laden air escaping into the environment.

FIG. 8 shows a section of the bulk material transfer system with a low bulk material flow with an air restrictor where the gap between the bulk material and the chute walls is minimized such that the pathway for the induced airflow is minimized, thereby minimizing the dust laden air that escapes into the environment.

FIG. 9 shows a section of the bulk material transfer system with a high bulk material flow without an air restrictor where the airflow runs parallel with the bulk material flow in the gap between the bulk material and the chute walls, which provides the pathway for the induced airflow, creating dust laden air escaping into the environment.

FIG. 10 shows a section of the bulk material transfer system with a high bulk material flow with an air restrictor where the gap between the bulk material and the chute walls is minimized such that the pathway for the induced airflow is minimized, thereby minimizing the dust laden air that escapes into the environment.

DETAILED DESCRIPTION OF THE INVENTION

Figure 1:
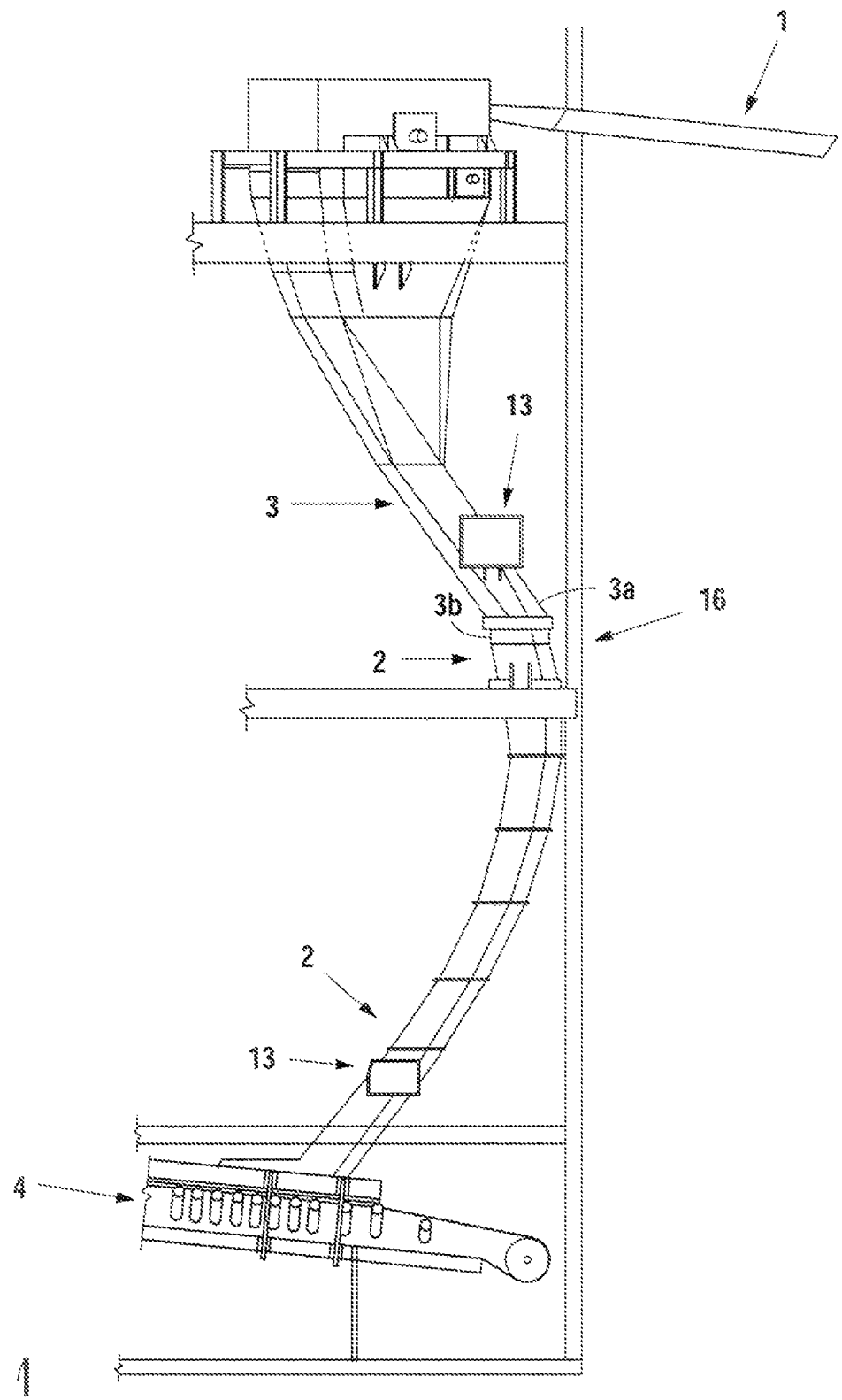
FIG. 1 shows a vertical side view of a transfer chute with a dust control apparatus integrated into a bulk material transfer system.
Figure 2:
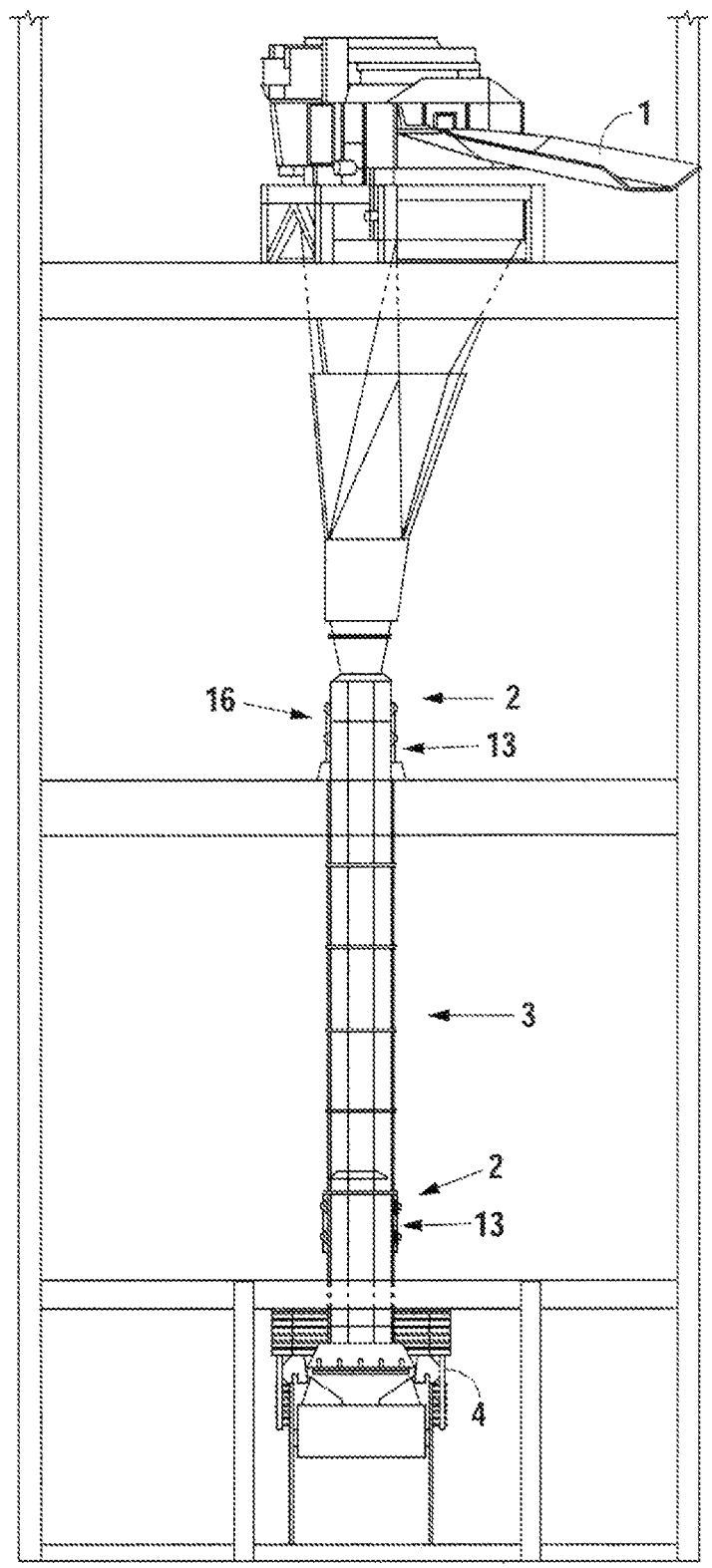
FIG. 2 shows a vertical front view of a gust control apparatus integrated into a bulk material transfer system.

A preferred embodiment of the instant invention is shown in typical installations such as shown in FIGS. 1 and 2. Dust control apparatuses 13 are shown installed into a bulk material transfer system 16. Multiple dust control apparatuses could be used depending on the type of transfer chute involved. The discharge conveyor 1 at the upper or top portion discharges bulk material 12 (see FIGS. 7-10) into the transfer chute 3, where the material runs down and along the transfer chute lower wall 3b. The material then passes through the one or more air restrictor locations 2 positioned along the chute and finally exiting the transfer chute 3 onto the exit conveyor 4 at the bottom of the chute.

Figure 3:
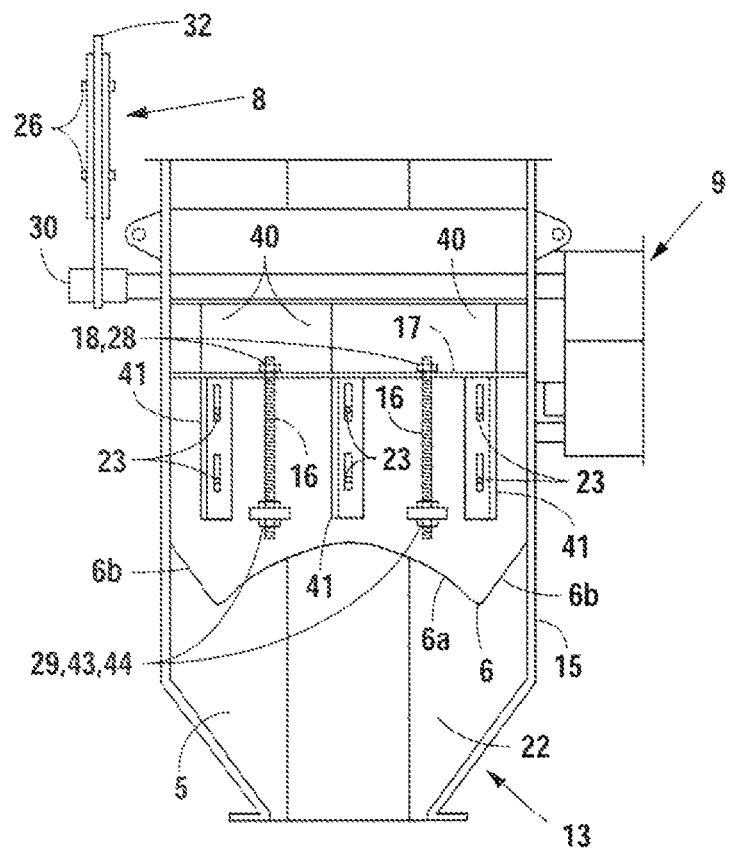
FIG. 3 shows a top view of the details and components of the dust control apparatus as installed in the bulk material transfer system shown in FIGS. 1 and 2.
Figure 4:
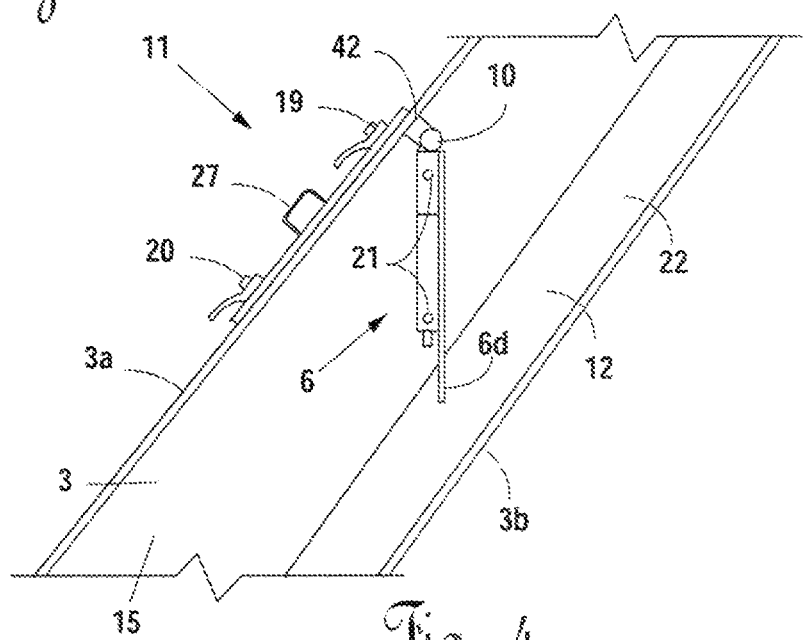
FIG. 4 shows the details and components of an air restrictor from the side.

Referring to FIG. 3, a dissected top view of the dust control apparatus 13 is shown. The transfer chute opening 5 is shown in the shape of a modified hexagon, but it may be in other geometric shapes, depending on the shapes of the transfer chute 3. The air restrictor gate or baffle 6 has a lower concave edge 6a with outer angled edges 6b and 6e, to correspond and fit the shape of the transfer chute 3 (see FIG. 1), in order to minimize the induced airflow. The upper surface of the flowing material through the chute may be slightly domed so that it conforms to the concave edge 6a and minimizes and closes off any air gaps. Gravity maintains the concave edge 6a in contact with the flowing bulk material. The air restrictor gate 6 is typically of non-reactive metal and the lower surface of the air restrictor gate 6 is typically flat. The lower portion of the air restrictor gate 6 may have a hardened or other wear resistant surface 6d to resist wearing away from the abrasive force of the flowing bulk material that comes in contact with the lower portion of the gate The transfer chute 3, the transfer chute opening 5, and the air restrictor gate 6 may be standard shapes as are known in the art to be used for a transfer chute. They can be designed for optimal flow, thereby minimizing material degradation. The air restrictor gate 6 may pivotally hang vertically down from the upper wall 3a such that it is at an acute angle from the upper wall 3a as shown in FIGS. 3-4. The upper portion of the air restrictor gate 6 is attached to the rotating shaft 10. The rotating shaft 10 is rotatably attached to the transfer chute via bearings 10a and 10b shown in FIG. 12. This off center mounting causes the air restrictor gate 6 to hang downwardly from gravity forces. The air restrictor gate 6 controls the size of the opening of the passageway through the chute. The air restrictor gate 6 is generally impervious to any air flow and intended to limit the size of the opening to approximately the cross sectional area of the flowing material. The size increases as the volume of flowing bulk material increases and decreases when the volume of flowing material decreases. Because the air restrictor gate 6 is typically rigid and impervious, air is restricted from flowing through it and can only pass around its edges. The tolerance of the air restrictor gate 6 and the chute inner side and upper walls is designed to minimize air flow.

Referring to FIG. 3, a mounting plate member 40 is secured to the shaft 10 and extends downward to where it is connected to bar 17. The bar 17 is connected to three adjusting brackets 41 that have two longitudinally extending slots for receiving adjusting bolts. Threaded adjusters 16 extend through 16 apertures in the bar 17. The upper ends of the threaded adjusters have adjusting taps or nuts 28. The lower end of the threaded adjusters 16 extend through apertures in the mounting bars 43 and are secured using two taps or nuts 29 on each side of the mounting bars. The threaded adjusters 16 are used to raise and lower the air restrictor 6 to the desired height based on the type and volume flow of bulk material 12 (see FIGS. 8 and 10). The air restrictor gate 6 can be replaced when it becomes worn from the abrasion of the bulk material.

At one end of the round shaft 10, at the left side in FIG. 3, at the left exterior wall 14 of the transfer chute 3, the shaft 10 has a bracket 10d attached thereto with an upwardly extending flat bar 32. A counterweight mechanism 8 is adjustably attached to the upper portion 10e of the bar 32 with adjusting setscrews 26. The counterweight mechanism 8 is adjustably movable along the length of the counterweight mechanism bar 32, which is attached to shaft 10 via attachment bracket 30 (see 11, which shows the counterweight mechanism 8 on the right side of the dust control apparatus 13). The counterweight mechanism 8 as shown in FIG. 3 helps to offset the weight of the air restrictor gate 6, which generally hangs vertically in the shaft from the chute upper wall 3a when no material is flowing in the chute. The counterweight mechanism 8 can be field adjusted to achieve optimum air restrictor gate 6 performance and the securing set screws are tightened to secure the counterweight to the bar 32. The counterweight mechanism offsets some of the weight of the air restrictor gate 6 and reduces the force required to raise and lower the air restrictor gate 6. The counterweight mechanism 8 lessens the force of the lower edge of the gate 6 on the upper surface of the bulk material that flows through the chute. The mechanism 8 can be varied depending on the weight of the gate and the amount of force needed to be exerted on the flowing bulk material to maintain blockage of air flow because the gate is in contact with the flowing bulk material.

Alternatively, the counterweight mechanism can be weights that are hung from a horizontal bar or lever attached to the shaft 10. Alternatively, the counterweight mechanism may be a spring. In this embodiment, in the case of an adjustable tension spring, it could be attached to the upper portion 10e of the bar 32 and to connections on the side of the chute. Alternatively, the counterweight mechanism can be an adjustable coil spring to reduce the force required to lift the air restrictor gate 6 to vary the size of the passageway through the chute. In certain situations a counterweight mechanism might not be required.

At the other end of the shaft 10, on the right exterior wall 15 of the transfer chute 3, the shaft 10 is attached to the damper 9 via a damper bracket 35, which attaches to the shaft 10 at attachment point 31. The damper 9 may be a conventional hydraulic shock absorber, spring or any other dampening device 9a, known in the art. A purpose of the damper 9 is to prevent the air restrictor gate 6 from flapping back and forth in order to minimize the oscillation frequency when it is moved back and forth by varying amounts of material flowing through the chute. The lower edge of the gate 6 rides on the upper surface of the flowing bulk material. Because the height of the flowing bulk material varies the gate 6 may move up and down to accommodate the flowing bulk material. The damper 9a helps maintain the edge 6a of the gate 6 in contact with the upper surface of the flowing bulk material by damping any oscillations to block air flow through the chute.

Referring to FIG. 4, on the upper wail 3a of the transfer chute 3 an access door 11 can be provided to allow easy access to the air restrictor gate 6. The access door 11 has an upper latch 19 and a lower latch 20 that can be opened to provide access to the interior of the dust control apparatus 13 (see FIG. 11). On the outside of the access door 11 is a handle 27 (see FIGS. 5 and 11). The access door 11 is attached to the upper wall 3a via upper screw 33 and lower screw 34, show in FIG. 11 and locked via upper latch 19 and lower latch 20 (see FIG. 11).

The air restrictor gate 6 is shown in the generally vertical position, hanging from rotating shaft 10 just above the access door 11, restricting airflow and allowing bulk material 12 to flow through the bulk material pathway 22. The shaft 10 is adjacent the bracket 42 which blocks air flow above shaft 10.

Figure 5:
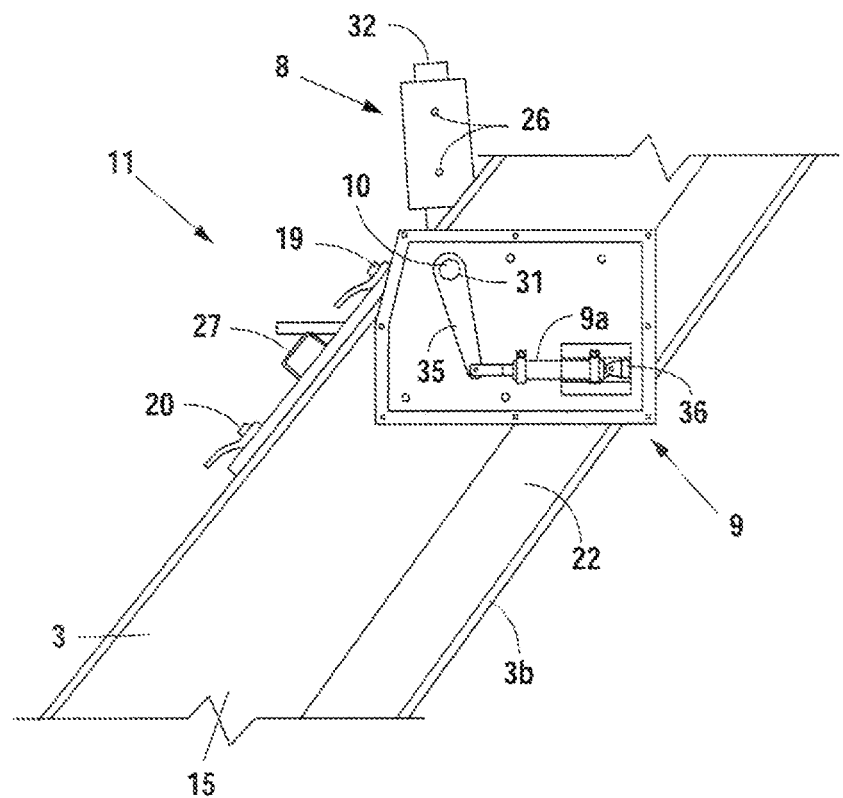
FIG. 5 shows the details and components of the damper system used to allow the air restrictor to self-adjust.

A right side view of the dust control apparatus 13 is shown in FIG. 5 with a frontal view of the damper means 9 on the right exterior wall 15. The damper 9a is pivotally connected to damper arm 35 which is attached to the shaft 10 at attachment point 31 (see FIG. 11). The opposed end of the damper 9a is pivotally attached to the bracket 36 on the damper means 9, FIG. 12. The access door 11 is shown on the upper wall 3a. The counterweight mechanism 8 is shown as being on the left exterior wall 14, FIG. 6.

Figure 6:
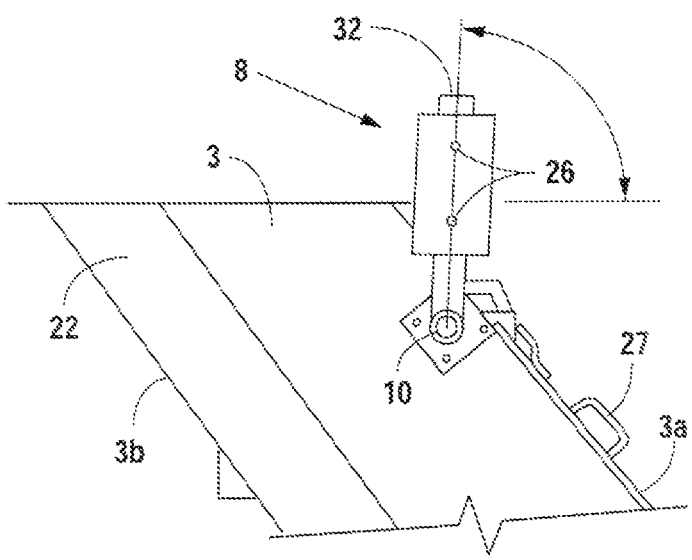
FIG. 6 shows the details and components of the counterweight mechanism used to allow the air restrictor to self-adjust.

FIG. 6 shows a left side view of the dust control apparatus 13. On the exterior wall 14, the vertical counterweight mechanism 8 is attached to the bar 32 which attaches to shaft 10 at attachment point 30.

Referring to FIG. 740, flowing bulk material 12 that may be transferred by a discharge conveyer 1 through a transfer chute 3 to an exit conveyer 4, is depicted. Examples of material 12 that could be transferred using the present invention include, but are not limited to solid materials such as coal, and primary metals elements such as bauxite, alumina, iron ore, coke, limestone, copper ore, or the like as well as grains such as wheat or corn. FIG. 7 shows the passage of a light load of bulk material 12 in bulk material pathway 22 along the transfer chute lower wall without an air restrictor. Induced air flows freely above the bulk material in the transfer chute 3.

In FIG. 8, the same light load of bulk material 12 is sent through the transfer chute 3, but this time an air restrictor gate 6 blocks the pathway of induced air flow. The upper surface of the bulk material 22 is maintained in contact with the lower surface 6a of the air restrictor gate 6 to block air flow. FIGS. 9 and 10 show the pathway and blocked pathway of a higher load of bulk material 12 without and with an air restrictor gate 6, respectively. FIGS. 8 and 10 illustrate how the air restrictor gate 6 self adjusts when used with varying high and low loads of bulk material 12 via the movement of the air restrictor gate 6 on the shaft 10. The flowing bulk material 12 flows underneath the pivoting gate 6 to minimize dust generation. Again, the upper surface of the bulk material 22 is maintained in contact with the lower surface 6a of the air restrictor gate 6 to block air flow. By keeping the bulk material stream condensed with the air restriction gate during flow through the transfer chute, noise is also reduced during operation.

Figure 11:
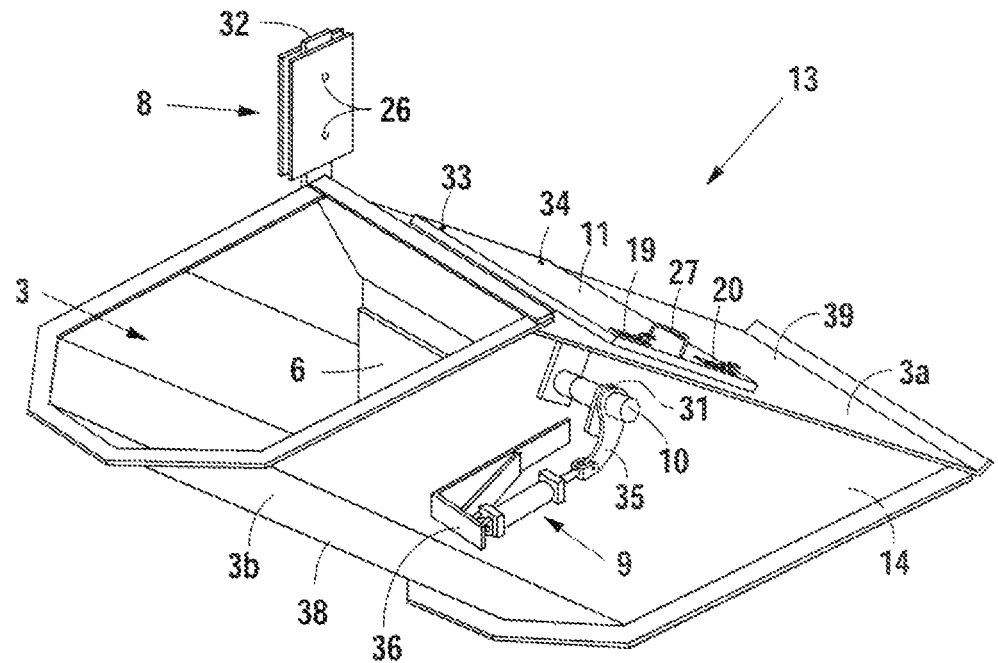
FIG. 11 shows an isometric view of the dust control apparatus.
Figure 12:
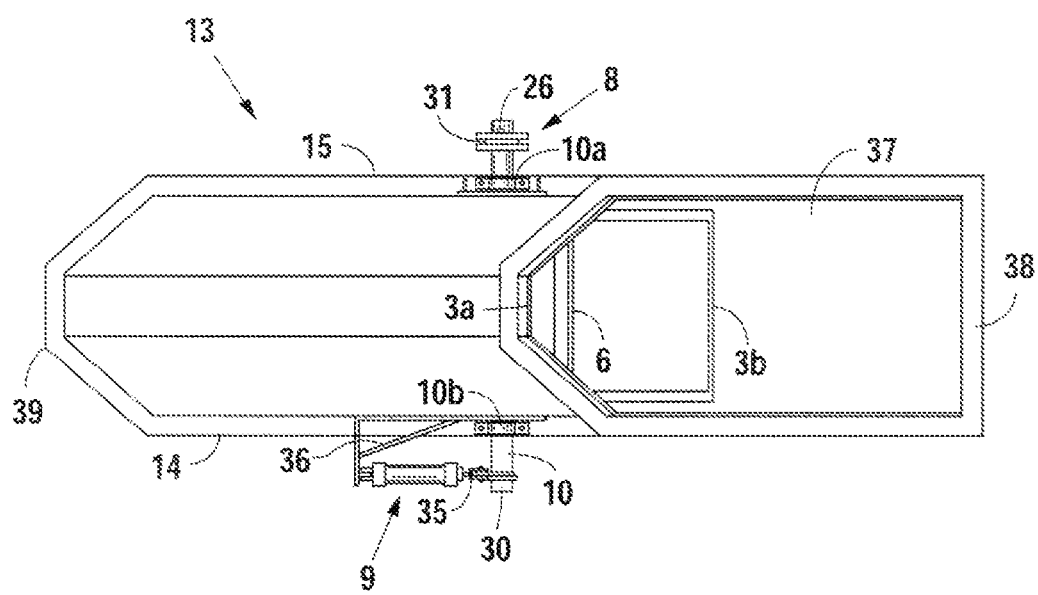
FIG. 12 is a bottom view of the dust control apparatus.

FIGS. 11 and 12 show a perspective view of the dust control apparatus 13 including the rear wall 38 of the dust control apparatus 13. The counterweight mechanism 8 is shown on the left exterior wall 14, and the damper 9 is shown on the right exterior wall 15. Also shown is a front view of the access door 11 with handle 27. The access door 11 is attached to the apparatus 13 at upper screw 33 in the top right corner of the door 11 and lower screw 34 in the bottom right corner of the door 11. The door 11 is locked via upper latch 19 in the top left corner and lower latch 20 in the bottom left corner of the door 11. In this view of the apparatus 13, the apparatus 13 is constructed to fit a chute 3 that is angled opposite to that shown in FIGS. 3-6.

In operation, varying amounts of bulk material may be flowed through the chute. The air restrictor gate 6 automatically adjusts to the varying flow by pivoting up and down to stay in contact with the rising and lowering upper surface of the flowing bulk material. The dust is controlled in handling the bulk material handling transfer system using the following steps. The bulk material is flowed into the chute at an upper entrance zone from a transfer chute that receives the material from a discharge conveyor and is expelled from the chute back into the transfer chute and onto a receiving conveyor at the lower exit zone of the transfer chute. The bulk material is flowed through the transfer chute using gravity flow through the pathway through the chute. During flow of the bulk material, the air flow accompanying the bulk material through the chute is restricted by using the self-adjusting air restrictor gate that restricts the air pathway during material volume flow variations. The pathway opening through the chute is varied corresponding to the flow of bulk material, which is caused by the self-adjusting air restrictor opening and closing in response to the rise and fall of varying amounts of flowing bulk material through the chute to restrict the flow of air to reduce dust emissions. Gravity holds the air restrictor gate against the upper surface 22a of the flowing bulk material. The movement of the air restrictor gate is controlled and damped when varying amounts of bulk material are flowing through the chute. The counterweight mechanism and the damper system are adjusted based on the type of material to minimize the impact of the gate on the material flow. The bulk material may be fine or coarse. The bulk material may also have varying amounts of water.

For a very fine and light flowing bulk material, the counterweight system can be adjusted so that the center of gravity of the apparatus is very close to the pivot point and therefore takes very little force to lift the air restrictor gate 6. With a very coarse or heavy material the counterweight system can be adjusted so that the center of gravity is more towards the air restrictor gate tip 6 and in affect it will be harder for the material to move the air restrictor gate 6. The passage of air through the chute is restricted when varying amounts of the bulk material is flowing through the chute by use of the self-adjusting air restrictor that maintains contact with the upper surface or the flowing bulk material so there is no gap that would allow air to flow with dust.

In one installation, a 6,000 TPH coal transfer was replaced with the passive dust control technology of the instant invention, the dust control apparatus with air restrictors. The entire transfer chute work and skirting systems were replaced to reduce induced airflow, maintain existing material flow quantities without plugging, and minimize load zone material spillage. Modern chute design was used to help center load the belt at near belt speed, reducing belt wear, helping to prevent material degradation, and maintaining material consolidation.

The purpose of air restrictors 13 is to consistently minimize the gap between the bulk material and the air restrictor gate member 6 and the inner chute walls and restrict the air from following the bulk material flow down the chute. Eliminating or greatly minimizing the gap prevents the induced airflow from rushing through the bulk material transfer system, thereby creating dust clouds at the chute exit point. The air restrictor gate member provides the mechanism to successfully restrict the pathway for the airflow under varying bulk material loading conditions such as loading 250 TPH on one day and then loading 6,000 or more TPH the next day. The material flow could be lower or even greater.

The self-adjusting gate and chute throat opening accommodate varying material volumes. The introduction of air restrictor gate members provides a simple mechanism to eliminate any gap or air pathway during material volume variations. The adjustable chute sections (air restrictors) restrict the induced airflow directly, without interrupting or decelerating the flow of material, by closing the gap between the material and the chute walls and gate. Due to bulk material being delivered to the plant by barge in this installation, sometimes the bulk material undergoes moisture accumulation resulting in wet material being conveyed through the transfer chute. This may cause significant material carry back and occasional chute plugging.

The new passive dust control transfer system of the invention can be used to handle varying moisture content as well as variations in material volumes. When load volumes change from full load to partial load, air may be allowed to rush through the chute with the material, thereby picking up airborne dust from the bulk material. When coal is flowed through the chute, a goal is to mitigate coal dust to meet dust emissions requirements while operating at full or partial load. Additional goals include eliminating spillage, minimizing coal carry back, increasing the service life of the chute, and facilitating ease of wear plate replacement. Ultimately, the goals of the instant invention are little or no visible dust with no suppression, no dust collection, and no fogging.

The above-listed sections and included information are not exhaustive and are only exemplary or the invention. The particular sections and included information in a particular embodiment may depend upon the particular implementation and the included devices and resources. Although a system and method according to the present invention have been described in connection with the preferred embodiments, it is not intended to be limited to the specific form set forth herein, but, on the contrary, it is intended to cover such alternatives, modifications, and equivalents, as can be reasonably included within the spirit and scope of the invention as defined by the appended claims.

What is claimed is:

1. A dust control apparatus for a bulk material handling transfer system comprising:
   a chute comprising a pathway there through for handling varying volumes of bulk material flowing through the chute using gravity flow;
   the chute further comprises an entrance zone and an exit zone, wherein a flow of material is received into the chute at the entrance zone from a transfer chute that receives the material via a discharge conveyor, and the material passes through exit zone of the chute into the transfer chute and is expelled onto a receiving conveyor;
   a self-adjusting air restrictor gate pivotally mounted inside the chute for engaging flowing bulk material for restricting the air pathway during material volume flow variations;
   said air restrictor gate having a mounting system to allow the air restrictor gate to maintain contact with the flowing bulk material through the chute to close off any air gap and to vary the size of the pathway in response to the change in volume of flow of bulk material through the chute and to restrict the flow of air through the chute and around the air restrictor gate to reduce dust emissions;
   the air restrictor gate comprises a gate member that is pivotally mounted off center so that it hangs from an upper wall of the chute in a neutral position partially closing off the chute pathway when no bulk material is flowing through the chute, and it contacts the upper surface of flowing bulk material and to eliminate any gaps in response to the flow of bulk material through the chute to restrict the flow of air through and out the chute to reduce dust emissions;
   the chute comprises an upper wall portion and a lower wall portion;
   the air restrictor gate member is pivotally mounted to the upper wall portion so that it hangs in the neutral position when no bulk material is flowing through the chute, and moves up and down in response to engagement with the upper surface of flowing bulk material through the chute to restrict the flow of air to reduce dust emissions;
   a counterweight mechanism to help control the movement of the air restrictor gate when varying amounts of flowing bulk material contacts the lower portion of the air restrictor gate; and
   the mounting system comprises a rotatably mounted shaft that is connected to a damper shock absorber to help maintain controlled contact of the air restrictor gate with the upper surface of bulk material flowing through the chute.

2. The dust control apparatus of claim 1, wherein; the counterweight mechanism includes a weight.

3. The dust control apparatus of claim 1, wherein; the counterweight mechanism includes a spring.

4. A dust control apparatus for a bulk material handling transfer system comprising:
   a chute comprising a pathway there through for handling varying volumes of bulk material flowing through the chute using gravity flow;
   the chute further comprising an entrance zone and an exit zone, wherein a flow of material is received into the chute at the entrance zone from a transfer chute that receives the material via a discharge conveyor, and the material passes through exit zone of the chute into the transfer chute and is expelled onto a receiving conveyor;
   a self-adjusting air restrictor gate mounted inside the chute for engaging flowing bulk material closing off any air gap in the air pathway during material volume flow variations;
   said air restrictor gate having a mounting system to allow the air restrictor gate to maintain contact with the flowing bulk material through the chute and to move up and down in the pathway in response to the flow of bulk material through the chute and to restrict the flow of air through the chute past the air restrictor gate to reduce dust emissions;
   the air restrictor gate comprising a gate member that is pivotally mounted off center so that it hangs from an upper wall of the chute in the neutral position partially closing the chute pathway when no bulk material is flowing through the chute, and it contacts the upper surface of flowing bulk material and moves up and down in response to the flow of bulk material through the chute to restrict the flow of air to reduce dust; and the mounting system comprising a rotatably mounted shaft that is connected to a counterweight mechanism and a shock absorbing damper to help maintain controlled contact of the air restrictor gate with the upper surface of bulk material flowing through the chute.

5. The dust control apparatus of claims 1 or 4, wherein:
The air restrictor gate has a lower concave edge and outer angled edges.

6. The dust control apparatus of claims 1 or 4, wherein:
The air restrictor gate has an upper portion and a lower portion and at least one adjuster to raise and lower the air restrictor gate to a desired height based on the type and volume flow of bulk material.

7. The dust control apparatus of claims 1 or 4, wherein:
The lower portion of the air restrictor gate has a hardened or other wear resistant surface to resist wearing away from the abrasive force of the flowing bulk material that comes in contact with the lower portion of the gate.

8. A method for controlling dust in a bulk material handling transfer system, comprising the steps of:

flowing bulk material through a transfer chute using gravity flow through the pathway through the chute;

restricting air flow that accompanies the flowing bulk material through the chute by the engaging a self-adjusting air restrictor gate inside the chute with the flowing bulk material to move it from a neutral position partially closing the chute pathway to minimize any air gap and block the air pathway through the chute during flowing varying amounts of bulk material through the chute;

controlling the air gap and air flow through the chute by the contact of the flowing bulk material through the chute by pivoting the air restrictor gate up and down in response to engagement with the varying flowing bulk material through the chute to maintain the engagement of the air restrictor gate with the varying flowing bulk material and restrict the flow of air to reduce dust emissions; and flowing the bulk material into the chute at an entrance zone from a transfer chute that receives the material from a discharge conveyor and expelling the material from the chute into the transfer chute and onto a receiving conveyor at the exit zone of the transfer chute;

controlling the gate member when varying amounts of bulk material are flowing through the chute with a counterweight mechanism to offset the weight of the gate;

controlling the movement of a gate member when varying amounts of bulk material are flowing through the chute and engaging the gate member using a damper.

9. A method for controlling dust in a bulk material handling transfer system, comprising the steps of:

flowing bulk material through a transfer chute using gravity flow through the pathway through the chute;

restricting air flow that accompanies the flowing bulk material through the chute by the engaging a self-adjusting air restrictor gate inside the chute with the flowing bulk material to move it from a neutral position partially closing the chute pathway to minimize any air gap and block the air pathway through the chute during flowing varying amounts of bulk material through the chute;

controlling the air gap and air flow through the chute by the contact of the flowing bulk material through the chute by pivoting the air restrictor gate up and down in response to engagement with the varying flowing bulk material through the chute to maintain the engagement of the air restrictor gate with the varying flowing bulk material and restrict the flow of air to reduce dust emissions; and controlling the gate member when varying amounts of bulk material are flowing through the chute with a counterweight mechanism to offset the weight of the gate and a damper.

10. The method of claims 8 or 9, comprising the step of:
raising and lowering the air restrictor gate to a desired height based on the type and volume flow of bulk material.

* * * * *